United States Patent [19]

Palmer

[11] Patent Number: 4,543,992
[45] Date of Patent: Oct. 1, 1985

[54] FLUID COUPLING ASSEMBLY
[75] Inventor: William B. Palmer, Palos Verdes Estates, Calif.
[73] Assignee: TRW Inc., Redondo Beach, Calif.
[21] Appl. No.: 564,946
[22] Filed: Dec. 23, 1983
[51] Int. Cl.$^4$ .................. F16L 29/00; F16K 31/05
[52] U.S. Cl. ...................... 137/614; 137/637.05; 251/129.03; 74/625
[58] Field of Search .......... 137/614, 637.05, 614.04; 251/89.5, 130, 133; 318/2; 74/625

[56] References Cited
U.S. PATENT DOCUMENTS

| | | | |
|---|---|---|---|
| 2,503,563 | 4/1950 | Ray | 251/133 |
| 2,663,315 | 12/1953 | Snyder . | |
| 2,724,289 | 11/1955 | Wight | 74/625 |
| 2,773,706 | 12/1956 | Leavell | 137/637.05 |
| 2,834,613 | 5/1958 | Snyder . | |
| 2,848,904 | 8/1958 | Wilson et al. | 74/625 |
| 3,167,092 | 1/1965 | Kelly et al. . | |
| 3,212,355 | 10/1965 | Visin | 74/625 |
| 3,236,251 | 2/1966 | Hansen . | |
| 3,346,575 | 10/1967 | Simak . | |
| 3,357,452 | 12/1967 | Larkin et al. . | |
| 3,367,366 | 2/1968 | Oliveau et al. . | |
| 3,528,447 | 9/1970 | Kolb | 137/614 X |
| 3,530,887 | 9/1970 | Stratman . | |
| 3,537,476 | 11/1970 | Evans . | |
| 3,549,175 | 12/1970 | Evans . | |
| 3,550,624 | 12/1970 | Johnson . | |
| 3,572,163 | 3/1971 | Clark | 74/625 |
| 3,791,411 | 2/1974 | Bogeskov et al. . | |
| 4,103,712 | 8/1978 | Fletcher et al. | 137/637.05 |
| 4,200,121 | 4/1980 | Walter et al. . | |
| 4,213,482 | 7/1980 | Gondek . | |
| 4,222,411 | 9/1980 | Herzan et al. | 137/614.06 X |
| 4,234,161 | 11/1980 | Wilder et al. | 251/149.9 |
| 4,265,142 | 5/1981 | Watanabe | 74/625 |
| 4,269,226 | 5/1981 | Allread . | |

Primary Examiner—Alan Cohan
Assistant Examiner—John C. Fox
Attorney, Agent, or Firm—Stuart O. Lowrey; James W. Paul

[57] ABSTRACT

A fluid coupling assembly is provided for fluid transfer with relatively small pressure loss between a pair of fluid flow conduits and with little or no fluid spillage upon subsequent conduit separation. The coupling assembly comprises male and female valve units mounted respectively on the flow conduits and matingly engageable to align valve unit flow paths for fluid transfer between the flow conduits. The flow path of each valve unit is normally closed by an externally finned, motor-driven poppet valve having a valve head contoured for seated reception onto a valve seat and for substantially flush surface abutting engagement with the valve head of the other poppet valve to define a substantially minimum residual volume between the valve heads when the two valve units are matingly engaged. With the valve units engaged, the two poppet valves are independently retracted from their respective valve seats to open positions by a pair of drive motors to permit fluid transfer with relatively small pressure loss between the flow conduits, followed by drive motor operation to return the poppet valves to their closed positions prior to valve unit separation. Each drive motor is coupled to the associated poppet valve by a drive linkage including selectively operable manual override means for manually opening and closing the associated poppet valve in the event of drive motor failure.

4 Claims, 8 Drawing Figures

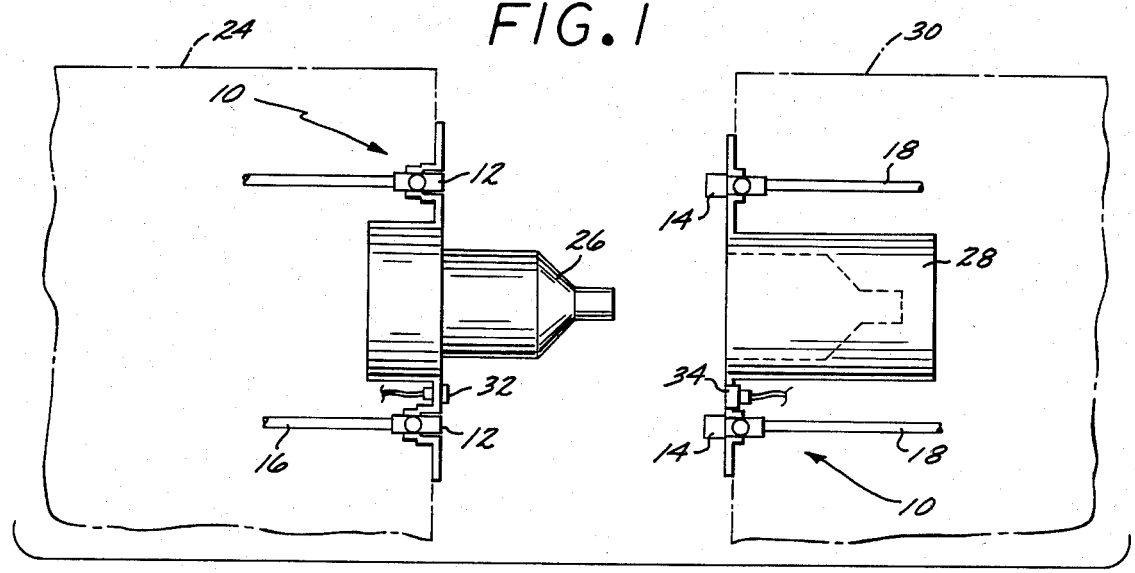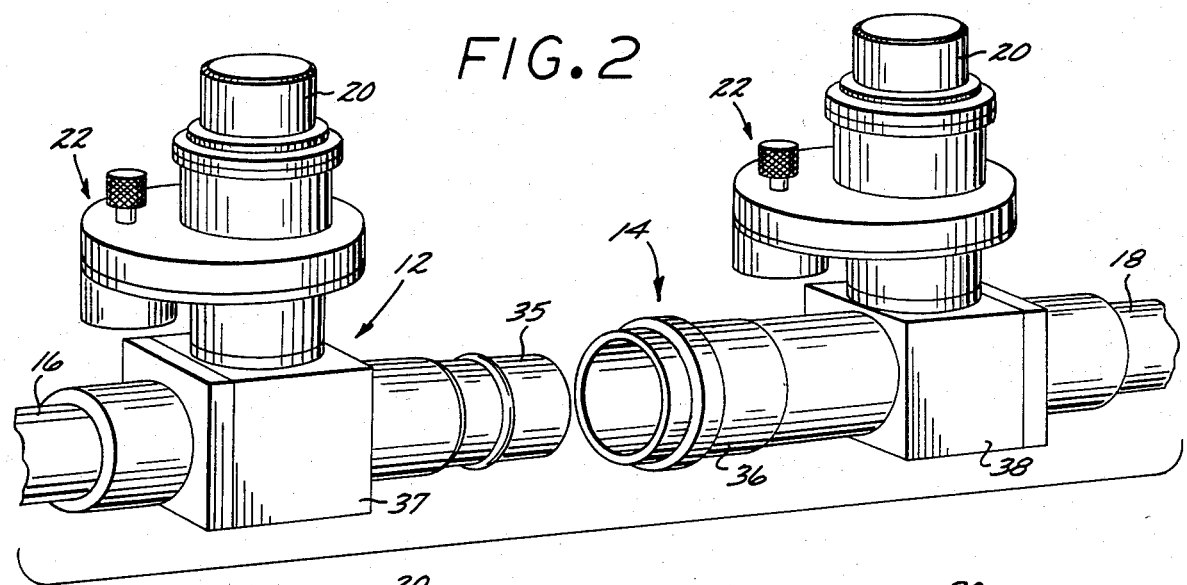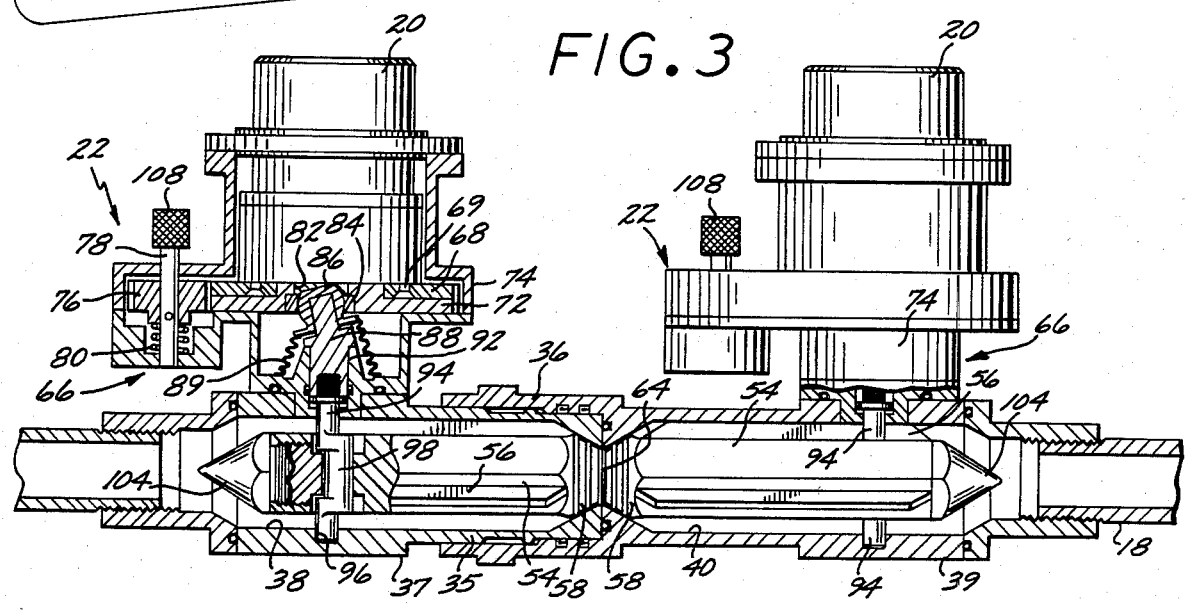

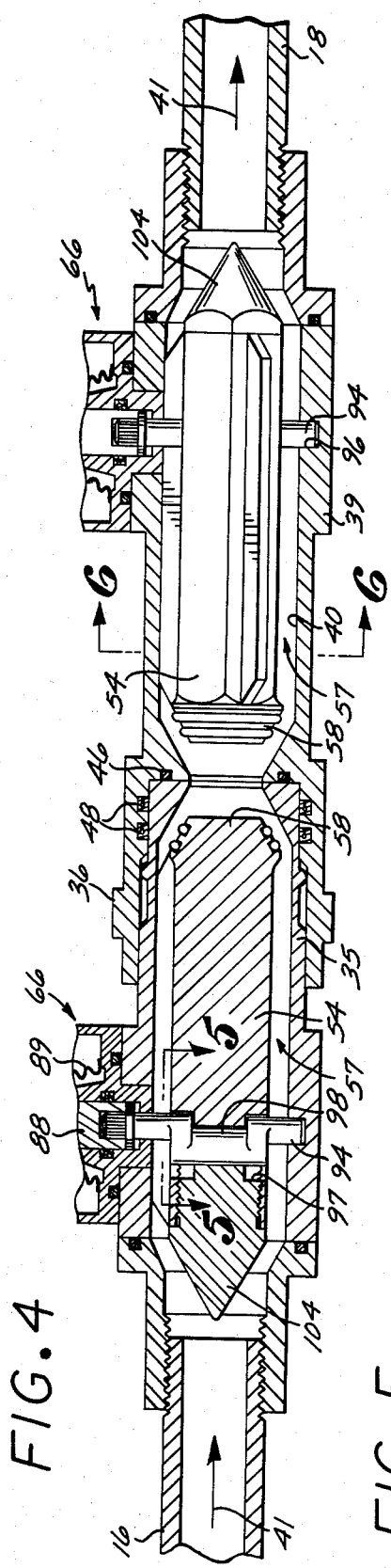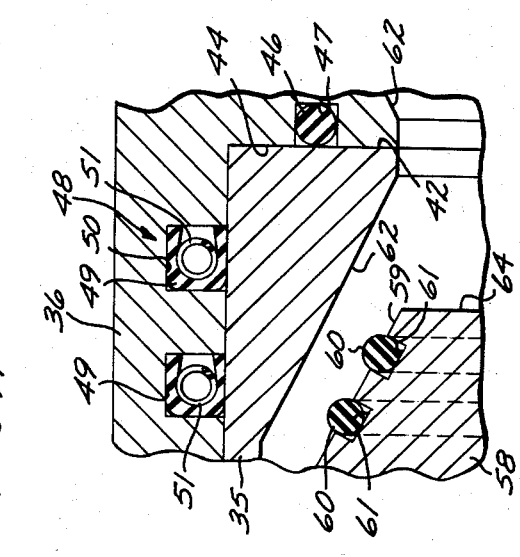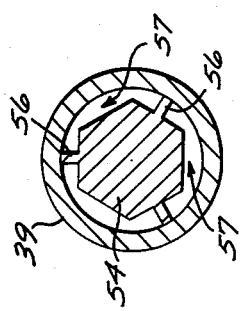
FIG. 4
FIG. 7
FIG. 6
FIG. 5
FIG. 8

FLUID COUPLING ASSEMBLY

BACKGROUND OF THE INVENTION

This invention relates generally to fluid flow couplings and coupling assemblies for releasable interconnection of fluid flow conduits to permit sealed fluid transfer between the flow conduits. More specifically, this invention relates to an improved fluid coupling assembly designed for fluid transfer with relatively small pressure losses and with minimum or no fluid spillage upon subsequent conduit separation, wherein the coupling assembly is particularly adapted for remote control operation and further includes convenient means for manual override operation.

Fluid couplings in general are widely known for use in temporarily connecting a pair of fluid flow conduits to permit sealed fluid transfer from one flow conduit to the other. For example, such fluid couplings have been used for many years in hydraulic power systems to permit rapid connection and disconnection of two hydraulic fluid flow conduits. In addition, such fluid couplings have been used in a wide variety of other fluid transfer environments, such as, for example, in the transfer of fuels, coolants, or other fluids from one aircraft or spacecraft to another. Fluid couplings have also been used in many applications in the chemical and petroleum industries to permit fluid transfer from one vessel to another, such as transfer from a fluid storage vessel to a petroleum container or the like for shipment and/or sale.

A typical fluid coupling construction includes a pair of matingly engageable coupling members mounted respectively on two fluid flow conduits, with each coupling member having an internal valve component movable to control fluid inflow or outflow with respect to the associated flow conduit. Whenever the two coupling members are separated from one another, the respective valve components of the coupling members are normally maintained in closed positions preventing fluid loss or spillage from the flow conduits. However, when the coupling members are matingly engaged, the respective valve components are designed for movement to one positions permitting fluid flow through the connected coupling members from one flow conduit to the other. In the past, in many fluid couplings, the valve components have been spring-loaded to their normally closed positions and opening movement has occurred incident to mating engagement of the coupling members in response to abutting contact between the valve components. Subsequent valve component closure has occurred incident to separation of the coupling members permitting the springs to displace their respective valve components back toward the normally closed positions.

In fluid couplings of this general type, however, at least some fluid spillage is normally encountered each time the coupling members are engaged or separated. More particularly, movement of the coupling members toward an engaged relationship tends to result in at least partial opening of the valve components before a fully sealed coupling member engagement can be achieved, resulting in a small amount of fluid spillage to the surrounding environment. Similarly, when the coupling members are disconnected, a small quantity of fluid can escape to the environment before the spring-loaded valve components can be returned to their closed positions. Alternatively, and sometimes in addition, a small volume of residual fluid can become trapped between the valve components, wherein this residual fluid will spill to the surrounding environment upon subsequent coupling member disengagement. While minor fluid spillage may not present significant problems in some fluid transfer applications, such minor fluid spillage can be extremely undesirable and potentially hazardous in other applications, such as in the transfer of volatile or hazardous fuels or chemicals.

In some fluid coupling design, alternative valve components have been provided for opening and closure movements within associated coupling members in response to a drive input force independent of biasing springs, thereby permitting valve component opening and closure subsequent to fully sealed mating engagement between the coupling members. While such alternative designs advantageously overcome fluid spillage problems due to partial valve component opening when the coupling members are partially engaged, many such fluid couplings have not satisfactorily eliminated residual fluid volumes trapped between the valve members in the closed positions. Moreover, these and other fluid coupling designs have not provided a practical drive means for independent valve component movement adapted for remote control operation in a spacecraft environment or the like, while additionally providing a simple and easily operated manual override arrangement for redundant manual control of valve component movement.

There exists, therefore, a significant need for an improved fluid coupling assembly designed for fluid transfer between flow conduits with relatively small fluid pressure losses and with little or no fluid spillage upon subsequent conduit separation. Moreover, there exists a need for an improved coupling assembly adapted for remote control operation and including a practical manual override arrangement. The present invention fulfills these needs and provides further relates advantages.

SUMMARY OF THE INVENTION

In accordance with the invention, an improved fluid coupling assembly is provided for temporary connection of and controlled fluid transfer between a pair of fluid flow conduits. The coupling assembly comprises a male valve unit and a female valve unit carried respectively by the two flow conduits and including matingly engageable outboard ends. Each of the male and female valve units includes a motor-driven poppet valve movable between a closed position preventing fluid transfer and an open position permitting fluid transfer. The poppet valves of the two valve units are independently operated by a pair of drive motors, with drive linkages coupled between the respective drive motors and poppet valves including manual override means for accommodating manual poppet valve displacement in the event of drive motor failure.

In a preferred form of the invention, the male and female valve units are generally identical to each other with the exception of their outboard ends which have a matingly engageable male-female geometry for substantially sealed and seated reception of the outboard end of the male valve unit into the outboard end of the female valve unit. Each of the male and female valve units includes a flow path for appropriate fluid inflow or outflow with respect to the associated flow conduit, and a respective one of the poppet valves is supported by external fins within the flow path for axial sliding movement between the closed and open positions. In the closed position, a tapered conical valve head generally at the outboard end of the poppet valve seals with a correspondingly tapered valve seat, and an outboard face of the poppet valve seats with substantially flush surface abutting engagement against the outboard face of the poppet valve within the other valve unit when the two valve units are matingly engaged.

The drive motors respectively associated with the male and female valve units preferably comprise stepper motors adapted for remote control operation to individually and on command retract the associated poppet valves from their closed positions to permit fluid flow with relatively small pressure losses between the two flow conduits. The poppet valves may further be driven by the respective stepper motors for return from the open positions to their original closed positions, wherein the abutting outboard faces of the valve heads define a minimum residual volume therebetween for little or no fluid spillage upon subsequent separation of the male and female valve units.

Each stepper motor provides a rotary output coupled to a drive linkage which in turn transfers the motor output to a camshaft in driving engagement with the associated poppet valve. This drive linkage includes a drive gear driven by the stepper motor and a coaxial driven gear coupled to the camshaft, with an adjacent idler gear engaged with the drive and driven gears for transferring rotary motion therebetween. The idler gear is supported on an axially movable idler shaft biased by a spring for normal meshed engagement with the drive and driven gears but manually movable to a manual override position engaged only with the driven gear and rotatable manually for displacing the associated poppet valve between its open and closed positions.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a schematic diagram illustrating the use of fluid coupling assemblies in a spacecraft docking environment;

FIG. 2 is an enlarged perspective view illustrating a fluid coupling assembly embodying the novel features of the invention and including matingly engageable male and female valve units;

FIG. 3 is an enlarged fragmented vertical section, shown partially in elevation, of the fluid coupling assembly of FIG. 2 with the valve units in connected relation;

FIG. 4 is a fragmented vertical section similar to FIG. 3 and illustrating the coupling assembly in an open state for fluid transfer;

FIG. 5 is an enlarged fragmented horizontal section taken generally on the line 5—5 of FIG. 4;

FIG. 6 is an enlarged fragmented vertical section taken generally on the line 6—6 of FIG. 4;

FIG. 7 is an enlarged fragmented vertical section of a portion of the fluid coupling assembly and illustrating sealed mating engagement between the male and female valve units; and FIG. 8 is an enlarged fragmented vertical section of a portion of one of the valve units and illustrating manual override operation thereof.

DETAILED DESCRIPTION OF THE PREFERRED EMBODIMENT

As shown in the exemplary drawings, an improved fluid coupling assembly referred to generally by the reference numeral 10 is provided in the form of a male valve unit 12 matingly engageable with a female valve unit 14 for permitting and controlling fluid transfer between a pair of fluid flow conduits 16 and 18 to which the valve units 12 and 14 are respectively mounted. The male and female valve units 12 and 14 include internal poppet valves (not shown in FIG. 1) driven respectively and independently by a pair of drive motors 20 for movement between open positions permitting fluid transfer flow through the coupling assembly 10 with relatively small fluid pressure losses and closed positions for minimizing or eliminating fluid spillage upon subsequent valve unit separation. Manual override means 22 are provided to enable poppet valve displacement in the event of drive motor failure.

The fluid coupling assembly 10 of the present invention is designed for use in a wide variety of fluid and/or pressure transfer environments requiring periodic temporary coupling of a pair of fluid flow conduits. As one example, as depicted generally in FIG. 1, the fluid coupling assembly 10 can be used in a spacecraft docking environment wherein a first spacecraft 24 carries a docking latch mechanism 26 for guided and locked reception into a docking receptacle 28 of a second spacecraft 30. Docked engagement between the spacecraft is accompanied by mating engagement between one or more of the male valve units 12 with corresponding female valve units 14 on the spacecraft 30. When engaged, the pairs of male and female valve units 14 can be appropriately operated to permit transfer of a fluid, such as fuel propellant, collant, or the like, in either direction between the associated fluid flow conduits 16 and 18 which may in turn be coupled to fluid storage vessels (not shown) or the like. Other types of non-fluid coupling assemblies may also be provided, such as mating electrical fittings 32 and 34. Alternatively, the fluid coupling assembly 10 of the present invention can be used in a wide variety of other fluid coupling environments, such as hydraulic systems, chemical or fuel transfer applications, and the like.

The fluid coupling assembly 10 of the present invention advantageously permits fluid transfer between the associated flow conduits 16 and 18 in a relatively unrestricted manner for relatively small fluid pressure losses through the two valve units. The coupling assembly 10 can thus be used particularly in fluid transfer environments having a minimum or relatively small pressure differential between the flow conduits without any significant impact upon transfer flow rate due to coupling pressure losses. Moreover, when fluid transfer is completed, the engaged valve units 12 and 14 provide a substantially minimized residual volume for fluid entrapment therebetween such that fluid spillage upon subsequent valve unit separation is minimized or virtually eliminated. The coupling assembly can thus also be used with hazardous or volatile liquids or in transfer environments wherein even small amounts of fluid spillage must be avoided. In addition, the fluid coupling assmebly 10 is particularly adapted for remote control operation while providing a convenient and practical means for manual override operation in the event of drive motor failure.

As shown in more detail in one preferred form in FIGS. 2-7, the fluid coupling assembly 10 comprises the male and female valve units 12 and 14 which are generally identical to each other with the exception of respective outboard ends 35 and 36 configured for sealed mating interengagement with each other. More particularly, the male valve unit 12 comprises a valve body 37 having one end coupled in any suitable manner to the fluid flow conduit 16 and a central axial flow path 38 (FIG. 3) formed through the valve body 37 in fluid communication with the interior of the flow conduit 16. The female valve unit 14 comprises a generally similar valve body 39 having one end suitably mounted on the other fluid flow conduit 18 and including a similarly sized internal central flow path 40 communicating with the interior of the conduit 18. When the male and female valve units 12 and 14 are matingly engaged, as will be described, the valve body flow paths 38 and 40 are coaxially aligned with each other for fluid transfer from the flow conduit 16 into the flow conduit 18, as illustrated by arrows 41 in FIG. 4, or vice versa.

The outboard end 35 of the male unit valve body 37 has a generally cylindrical axially projecting configuration centered about the flow path 38 and terminating in a substantially planar manner face 42 oriented generally perpendicular to a central axis of the flow path 38. This outboard end 35 of the valve body 37 provides a male coupling member for the assembly 10 having a size and shape for sliding reception into the outboard end 36 of the female unit valve body 39. This female unit outboard end 36 also has a generally cylindrical or sleeve-shaped geometry centered about the valve unit flow path 40 for relatively close mating reception of the male unit outboard end 35, with an internal annular shoulder 44 being provided for abutting and substantially flush surface contact with the annular face 42 of the male unit outboard end 35 when the two valve units 12 and 14 are matingly engaged.

A plurality of seal members cooperate between the outboard ends 35 and 36 of the two valve units 12 and 14 to provide a relatively tight fluid seal preventing fluid leakage between those outboard ends from either one of the valve unit flow paths 38 or 40 to the surrounding environment. As shown best in FIGS. 3 and 7, in the illustrative form of the invention, these seal members comprise an annular seal ring 46, such as a conventional O-ring of an elastomeric material or the like carried within a shallow annular groove 47 formed in the shoulder 44 of the female valve unit 14 for sealed engagement with the annular face 42 at the outboard end 35 of the male valve unit 12. In addition, one or more pressure-responsive seal units 48 in the form of annular rings 49 of Teflon or the like and having a generally U-shaped cross section are received into radially inwardly open grooves 50 in the female outboard end 36. These rings 49 are wrapped about and are biased radially inwardly by coil springs 51 for sealed sliding engagement with the outboard end 35 of the male valve unit 12.

As shown best in FIGS. 3-6, fluid flow through the valve bodies 37 and 39 of the male and female valve units 12 and 14 is respectively controlled by an identical pair of individually operated poppet valves 54. Each poppet valve 54 has a generally hexagonal cross-sectional shape sized to fit with substantial clearance into the associated valve body flow path 38 or 40. A plurality of axially elongated and radially projecting fins 56 support the poppet valve for sliding axial movement within the associated flow path and define a substantial and generally annular open region 57 for fluid flow between the poppet valve and the inner diameter surface of the valve body.

A valve head 58 is formed generally at the outboard end of each poppet valve 54. This valve head 54 includes a generally tapered or truncated sealing surface 59 carrying one or more resilient seal rings 60 within shallow encircling grooves 61 for sealed engagement with a similarly tapered valve seat 62 at the outboard end of the flow path when the poppet valve is in a closed position. In the closed position, as shown in FIG. 3, an outboard end of each poppet valve 54 defined by a substantially planar face 64 is positioned in substantially flush surface abutting engagement with a corresponding planar face 64 of the other poppet valve 54 to define a substantially minimum or eliminated residual volume between the poppet valves.

Each of the male and female valve units 12 and 14 includes one of the drive motors 20 for controllably moving the associated poppet valve 54 between a closed position as shown in FIG. 3 and an open position as shown in FIG. 4. More particularly, each drive motor 20 comprises an electrically operated stepper motor or the like adapted for remote control operation and drivingly coupled through a drive linkage 66 for moving the associated poppet valve 54 back and forth between the open and closed positions. Conveniently, since the drive linkage 66 is identical for both valve units 12 and 14, only the driven linkage 66 associated with the valve unit 12 will be described in detail herein.

More specifically, as shown best in FIG. 3, the drive motor 20 has a drive gear 68 secured thereto by a plurality of screws 69 or the like for rotational movement through a predetermined increment in response to drive motor actuation. This drive gear 68 is rotatable about the hub 70 of a coaxially mounted driven gear 72, wherein the drive and driven gears 68 and 72 are of the same diametric size and are disposed within a protected position within a linkage housing 74. An idler gear 76 is positioned within one side of this housing 74 pinned onto an idler shaft 78 and biased by a compression spring 80 to an appropriate position for meshed engagement with both the drive gear 68 and the driven gear 72.

The driven gear 72 has an off-center passage 82 formed within its hub 70 for driving interaction with an hermetically sealed drive unit 81 of the type commercially available from Mechmetals Corporation, Culver City, Calif., under the designation "Mechmetals Bellows Drive." More particularly, the driven gear hub 70 supports a drive ring 84 of a suitable low friction material mounted as by press-fitting or the like into the passage 82. This friction ring 84 in turn is slidably carried about a drive ball 86 rotatably mounted over an angularly set upper end of a driven shaft 88. This driven shaft 88 is isolated from the drive motor 20 and the gears 68 and 72 by a dynamic bellows seal 89 coupled between the bottom of the drive ball 86 and a portion of the linkage housing 74. The lower end of the driven shaft 88 is rotatably supported within a linkage housing boss 92 and in turn is appropriately splined for rotational driving engagement with the splined upper end of the crankshaft 94. Accordingly, rotational driving of the motor 20 is transferred through the various gears and the drive ball 86 to rotatably drive the driven shaft 88 and the crankshaft 94.

The crankshaft 94, which has its upper end drivingly engaged with the driven shaft 88, has a lower end rotatably supported within a small socket 96 on a side of the flow path opposite the drive linkage 66. Accordingly, the crankshaft 94 extends generally diametrically through the associated valve unit flow path, and, in this regard, through the associated poppet valve 54. As shown best in FIGS. 3-5, upper and lower portions of the crankshaft extend into upper and lower circular cavities 97 in the poppet valve 54, and a central offset cam portion 98 of the crankshaft extends through a laterally elongated, generally elliptical drive opening 100 in the poppet valve. Crankshaft rotation through an angle of about 180 degrees, therefore, is effective to axially displace the poppet valve from the closed position, as shown in FIG. 3, to the open position, as shown in FIG. 4, or vice versa.

In operation, when the male and female valve units 12 and 14 are matingly engaged, the planar faces 64 at the outboard ends of the two poppet valves 54 in the closed positions are carried into substantially flush abutting engagement thereby substantially eliminating any residual volume between the two poppet valves within which air, grit, or other contaminants might become trapped. After full sealed engagement between the valve units, the two drive motors 20 are energized preferably by remote control actuation to rotate their respective crankshafts 94 through an angle of about 180 degrees, thereby moving the poppet valves 54 to the fully opened positions (FIG. 4). When opened, fluid from the conduit 16 may flow relatively smoothly and with minimum pressure losses around the poppet valves 54 through the flow paths 38 and 40 of the two valve units into the flow conduit 18. Minimization of fluid pressure losses during such transfer is further enhanced by providing conically shaped guides 104 threaded into the ends of the poppet valves 54 opposite their respective valve heads 58.

When a fluid transfer procedure is completed, the drive motors 20 are actuated again to return their respective poppet valves 54 to the initial closed positions (FIG. 3). This returns the planar faces 64 of the two poppet valves to substantially flush surface abutting engagement thereby substantially eliminating any residual volume and presence of residual fluid which otherwise might be present between the poppet valves. Accordingly, when the valve units 12 and 14 are subsequently separated, there is little or no fluid leakage from either valve unit to the surrounding environment.

According to one primary aspect of the invention, in the event of failure of the drive motor 20 of either valve unit, or failure of related means for actuating the drive motor, the associated idler gear 76 provides the manual override means 22 for quickly and easily displacing the associated poppet valve 54 by a manual rotational input. More specifically, the idler shaft 78 associated with the idler gear 76 projects through a small clearance opening 106 in the linkage housing 74 and terminates in a manually accessible hexagonal end 108 for facilitating manual operation with a wrench. In the event of drive motor failure, this knob 108 can be pushed downwardly, as viewed in FIG. 8, to carry the associated idler gear 76 downwardly into an underlying depression 109 and out of meshing engagement with the drive gear 68 but still in meshed engagement with the driven gear 72. While holding the idler gear 76 downwardly against the compression spring 80, the shaft 108 can be rotated manually to rotate the driven gear 72 and thereby correspondingly rotate the crankshaft 94 for effecting poppet valve displacement. Accordingly, manual poppet valve movement between the open and closed positions is easily obtained, as required. When the downward pressure on the drive shaft 108 is released, the compression spring 80 returns the idler gear 76 to an upper position for engagement with both the drive and driven gears 68 and 72.

The improved fluid coupling 10 of the present invention thus provides for relatively low pressure fluid transfer between the fluid flow conduits 16 and 18 when the male and female valve units 12 and 14 are matingly engaged. When the poppet valves 54 are in the closed positions, residual volume between the valves is minimized or eliminated. Accordingly, the coupling assembly 10 can be used with relatively low pressure systems and further in an environment wherein fluid spillage upon conduit separation must be avoided. Both valve units are adapted for independent remote control operation by appropriate signalling of the stepper motors 20, with convenient and easily operated manual override means 22 permitting manual override operation, if necessary.

A variety of further modifications and improvements to the present invention are believed to be apparent to one of ordinary skill in the art. Accordingly, no limitation on the scope of the invention is intended by way of the description herein, except as specifically set forth in the appended claims.

What is claimed is:

1. A fluid coupling assembly for use in fluid transfer between a pair of fluid flow conduits, comprising:
a pair of valve units for mounting respectively onto the flow conduits and each including a flow path for flow communication with the respective one of the flow conduits, said valve units having matingly engageable outboard ends;
a pair of valve members carried respectively within the flow paths of said valve units and respectively movable between closed positions preventing fluid flow through said valve units and open positions permitting fluid flow through said valve units;
a pair of drive motors respectively associated with said valve units; and
a pair of drive linkages coupled respectively between said drive motors and said valve members for moving said valve members between the closed and open positions in response to operation of said drive motors;
each of said drive linkages including manual override means for disconnecting the associated one of said valve members from the associated one of said drive motors and for permitting manual displacement of said associated valve member between the closed and open positions, each of said drive linkages comprising a crankshaft rotatably supported by the associated one of said valve units and including an offset cam portion extending into a drive opening formed in the associated one of said valve members, and means coupled between said crankshaft and the associated one of said drive motors for rotating said crankshaft in response to drive motor operation, said coupling means comprising a drive gear rotatably driven by said associated drive motor, a driven gear for rotatably driving said crankshaft, an idler gear for transmitting rotary motion from said drive gear to said driven gear upon drive motor operation, means for movably supporting said idler gear for movement between a first position meshed with said drive and driven gears and a second position meshed with said driven gear and out of engagement with said drive gear, means for biasing said idler gear toward said first position, and manually accessible means for manually rotating said idler gear when said idler gear is in said second position.

2. The fluid coupling assembly of claim 1 wherein said drive and driven gears are coaxial with each other.

3. The fluid coupling assembly of claim 1 wherein said manually accessible means comprises a shaft rotatably supporting said idler gear and having a portion of said shaft projecting to an accessible position for manual rotation thereof, said shaft being axially movable with said idler gear for displacing said idler gear between said first and second positions.

4. A fluid coupling assembly for use in fluid transfer between a pair of fluid flow conduits, comprising:

a pair of valve units for mounting respectively onto the flow conduits and each including a flow path for flow communication with the respective one of the flow conduits, said valve units having matingly engageable outboard ends;

a pair of poppet valves carried respectively within the flow paths of said valve units and each having a valve head of a generally truncated conical configuration for sealed engagement with a matingly shaped valve seat formed generally at said outboard end of the associated one of said valve units, said poppet valves being movable between closed positions with their valve heads seated upon the respective valve seats to prevent fluid flow through said valve units and open positions permitting fluid flow through said valve units, said valve heads of said poppet valves further each including an outboard face for substantially flush abutting engagement with the outboard face of the other valve head when said poppet valves are in the closed positions and said valve units are matingly engaged, said valve heads being retracted from each other and their associated valve seats when said poppet valves are in the open positions;

a pair of crankshafts rotatably supported respectively by said valve units to extend through the associated one of said flow paths, each of said crankshafts including an offset central cam portion extending through a drive opening formed in the associated one of said poppet valves, said poppet valves being respectively movable between the open and closed positions in response to rotation of said crankshafts;

a pair of drive motors for independently and respectively rotating said pair of crankshafts; and a pair of drive linkages coupled respectively between said drive motors and said crankshafts, said drive linkages each including a drive gear rotatably driven by the associated one of said drive motors, a driven gear supported coaxially with respect to said drive gear and coupled for rotatably driving the associated one of said crankshafts, an idler gear movable between a first position in meshed relation with said drive and driven gears and a second position out of engagement with said drive gear and meshed with said driven gear, means for biasing said idler gear toward said first position, and manually accessible means for moving said idler gear to said second position and for rotating said idler gear while in said second position.

* * * * *